(12) United States Patent
Kameda et al.

(10) Patent No.: US 9,570,948 B2
(45) Date of Patent: Feb. 14, 2017

(54) MAGNETIC PLATE USED FOR ROTOR CORE OF MOTOR AND METHOD FOR MANUFACTURING MAGNETIC PLATE

(71) Applicant: NHK SPRING CO., LTD., Yokohama-shi, Kanagawa (JP)

(72) Inventors: Yohei Kameda, Yokohama (JP); Kazuo Iwata, Yokohama (JP); Yuji Araoka, Yokohama (JP); Yoshiki Ono, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 14/785,168

(22) PCT Filed: Apr. 15, 2014

(86) PCT No.: PCT/JP2014/002135
§ 371 (c)(1),
(2) Date: Oct. 16, 2015

(87) PCT Pub. No.: WO2014/171133
PCT Pub. Date: Oct. 23, 2014

(65) Prior Publication Data
US 2016/0065015 A1    Mar. 3, 2016

(30) Foreign Application Priority Data

Apr. 16, 2013   (JP) ................. 2013-086140

(51) Int. Cl.
*H02K 1/27* (2006.01)
*H02K 15/03* (2006.01)
*H02K 29/03* (2006.01)

(52) U.S. Cl.
CPC ............. *H02K 1/276* (2013.01); *H02K 15/03* (2013.01); *H02K 1/27* (2013.01); *H02K 1/2766* (2013.01); *H02K 29/03* (2013.01)

(58) Field of Classification Search
CPC ............ H02K 1/28; H02K 1/27; H02K 1/276; H02K 15/03
(Continued)

(56) References Cited

U.S. PATENT DOCUMENTS 4,434,546 A * 3/1984 Hershberger ........ H02K 1/2766
29/418
4,570,333 A * 2/1986 Jones .................... H02K 1/276
29/515
(Continued)

FOREIGN PATENT DOCUMENTS

JP   2003-304670   10/2003
JP   2004-007943   1/2004
(Continued)

OTHER PUBLICATIONS

Translated PCT ISR With Reasons for Allowance Dated Jul. 15, 2014.*

*Primary Examiner* — Dang Le
*Assistant Examiner* — Maged Almawri
(74) *Attorney, Agent, or Firm* — Norris McLaughlin & Marcus, P.A.

(57) ABSTRACT

A magnet plate used for a rotor core of a motor, includes a magnetic pole portion being set between an outer peripheral edge of a body portion and a magnet slot and having a radial width being smaller than a radial sectional width of the permanent magnet, and a higher hardness portion being formed into a hook shape along an end corner of the magnet slot and have a smaller width than the radial sectional width of the permanent magnet.

12 Claims, 10 Drawing Sheets

(58) Field of Classification Search
 USPC ............................ 310/156.53–156.63, 156.38,
         216.018,310/216.049, 216.103
 See application file for complete search history.

(56) References Cited

U.S. PATENT DOCUMENTS

| | | | | |
|---|---|---|---|---|
| 5,684,352 A * | 11/1997 | Mita | ................... | H02K 1/02 |
| | | | | 310/152 |
| 6,208,054 B1 * | 3/2001 | Tajima | ................... | H02K 29/03 |
| | | | | 310/156.53 |
| 6,340,399 B1 * | 1/2002 | Tanaka | ................... | C22C 38/002 |
| | | | | 148/308 |
| 7,098,564 B2 * | 8/2006 | Gehring | ................... | H02K 5/15 |
| | | | | 310/154.03 |
| 2001/0031216 A1 * | 10/2001 | Kohara | ................... | B22F 3/03 |
| | | | | 419/66 |
| 2003/0201685 A1 * | 10/2003 | Shimada | ................ | H02K 15/03 |
| | | | | 310/156.53 |
| 2009/0001839 A1 * | 1/2009 | Masayuki | ............... | H02K 29/08 |
| | | | | 310/156.16 |
| 2014/0327329 A1 * | 11/2014 | Kitada | ................ | C08G 59/621 |
| | | | | 310/43 |
| 2015/0001979 A1 * | 1/2015 | Deguchi | ................ | H02K 1/182 |
| | | | | 310/156.37 |

FOREIGN PATENT DOCUMENTS

| | | |
|---|---|---|
| JP | 2009-268328 | 11/2009 |
| JP | 2009268328 A | 11/2009 |
| JP | 2010-16961 | 1/2010 |
| JP | 2012-105410 | 5/2012 |
| JP | 2012-205429 | 10/2012 |
| WO | WO-2007/080888 | 7/2007 |

* cited by examiner

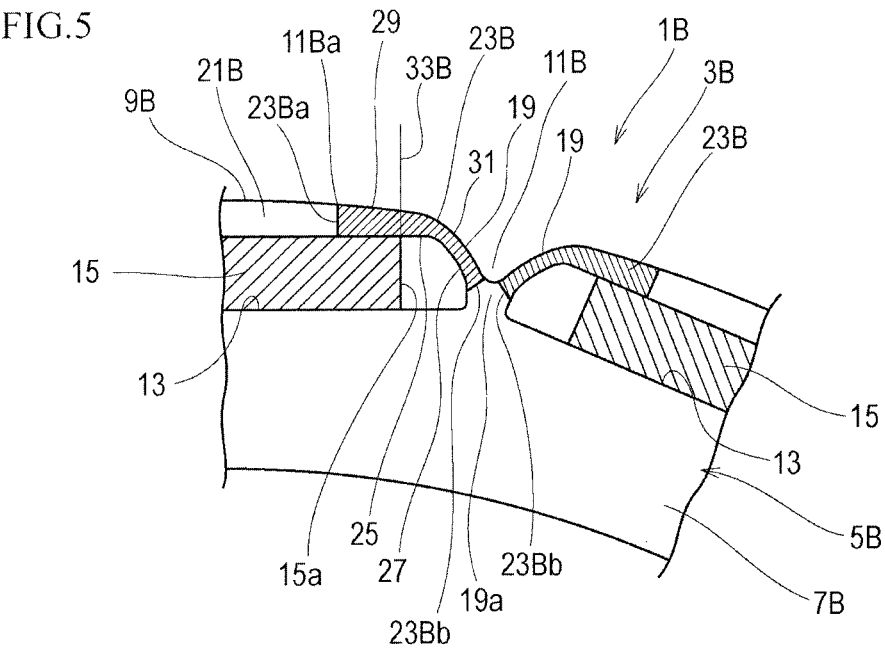
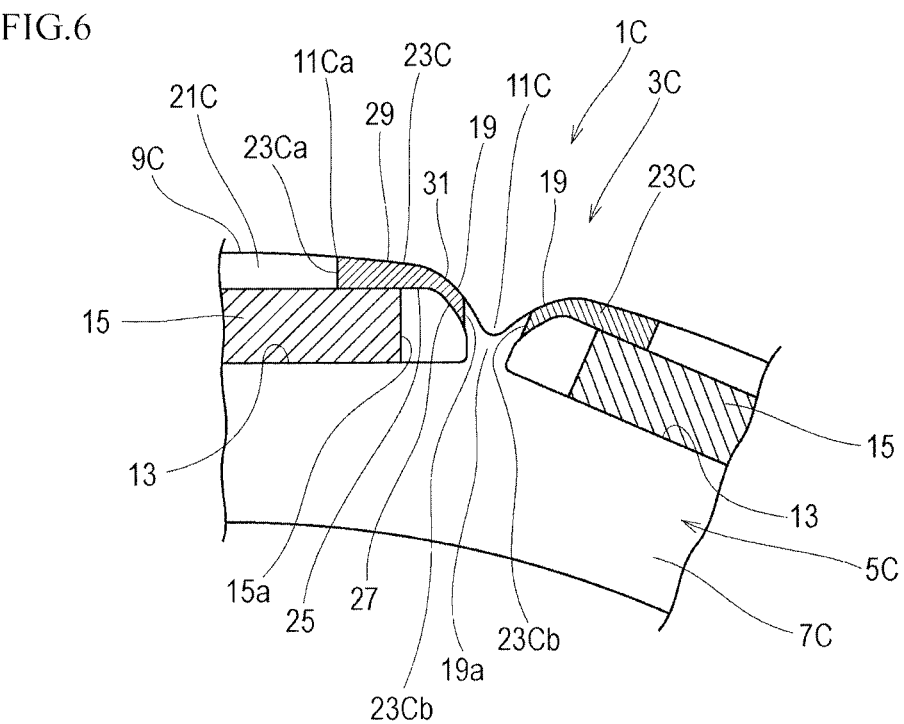

US 9,570,948 B2

MAGNETIC PLATE USED FOR ROTOR CORE OF MOTOR AND METHOD FOR MANUFACTURING MAGNETIC PLATE

FIELD OF THE INVENTION

The present invention relates to a magnetic plate used for a rotor core of a motor and a method for manufacturing the same.

BACKGROUND OF THE INVENTION

In recent years, in accordance with advances in new technology for a wide variety of electrical equipment, electric vehicles, hybrid vehicles, robots and the like, performance required for motors or electric generators used liar them becomes highly developed. For example, in industrial motors, electric vehicles, hybrid vehicles, or the like, there is a need for high torque, high output, space-saving and the like.

Accordingly, there is a conventional rotor of a motor disclosed in Patent document 1 as illustrated in FIGS. 20 and 21. FIG. 20 is a perspective view illustrating the rotor and FIG. 21 is a conceptual view illustrating magnetic flux distribution.

The rotor 101 includes a rotor core 105 in which a plurality of magnetic plates 103 having a circular shape as an annular shape are stacked one on another and permanent magnets 109 (hatched parts in both drawings correspond to cross-sections of the magnets extending in a magnetic-plate-stacking direction) held in openings 107 of the rotor core. The rotor 101 is inserted into a stator (not illustrated) that forms a rotation magnetic field so that the rotation magnetic field in the stator according to supplied power interlinks with magnetic flux generated on an outer peripheral surface of the rotor core according to the permanent magnets 109 to rotate the rotor 101 according to repulsion and attraction.

In the rotor 101, if radial widths of magnetic pole portions 103b formed between the permanent magnets 109 and an outer peripheral edge 103a of the magnetic plate 103 are minimized, magnetic resistance with respect to the stator interlinking with the magnetic flux is reduced to increase a magnetic field that is effective in torque. This allows the torque to become higher or the rotor to be downsized if the torque is constant. That is, it is advantageous for increase in torque per motor volume (hereinafter referred to as torque density).

However, the reduction in the radial width of the magnetic pole portion 103b is likely to cause plastic deformation at end corner portions etc. of the opening 107 due to stress concentration based on centrifugal force of the permanent magnet 109 etc, at the time of the rotation, reduces so-called centrifugal strength, and lowers the maximum number of rotation capable of resisting the centrifugal force. As a result, there is a limit on improvement of output per motor volume (hereinafter referred to as output density) and on downsizing.

Further, in the vicinity of the end portion 109a of the permanent magnet 109, there is a problem of inefficient formation of magnetic flux 110 that is formed so as to make a short circuit in the rotor, not to interlink with the stator, and not to contribute to the rotation torque of the rotor.

Further, in the rotor incorporating the permanent magnet 109 having a rectangular cross-section, the magnetic flux distribution caused on the outer peripheral surface becomes a rectangular wave shape including many higher harmonic waves and there is also a problem of increase in higher harmonic iron loss.

Contrary to this, a rotor 111 disclosed in Patent document 2 is proposed as illustrated in FIG. 22.

In the rotor 111, magnetic-flux-controlling portions 119a and 119b are provided at end corners of an opening 117 of a magnetic plate 115 holding a permanent magnet 113 and in a magnetic pole portion 115b so as to thin a thickness of the magnetic plate.

With this, magnetic flux distribution on a surface of the rotor 111 is converted into a sine wave to prevent a torque pulsatory motion.

However, if the magnetic-flux-controlling portions 119a and 119b are formed by etching, no strength is improved and improve in centrifugal strength is not expected.

On the other hand, the magnetic-flux-controlling portions 119a at the end corners of the opening 117 may be formed by hardening portions like Patent document 3.

However, the shape of the magnetic-flux-controlling portions 119a of Patent document 2 is not preferred for higher torque density, higher output density and downsizing and there is a limit on downsizing due to the reduction of the width of the magnetic pole portion 115b.

PATENT DOCUMENT 1: JP2003-304670A
PATENT DOCUMENT 2: JP2012-105410A
PATENT DOCUMENT 3: JP2004-7943A

SUMMARY OF THE INVENTION

A problem to be solved is that: the reduction in the radial width of the magnetic pole portion for higher torque is likely to cause plastic deformation at the end corner portions of the opening on which the stress concentration is generated based on the centrifugal force of the permanent magnet at the time of the rotation, reduces the centrifugal strength, and lowers the maximum number of rotation capable of resisting the centrifugal force, and this results in a limit on improvement of the output density and on downsizing; in the vicinity of the end portion of the opening, ineffective magnetic flux is formed so as not to contribute to the rotation torque of the rotor; and in the rotor incorporating the permanent magnet having the rectangular cross-section, the magnetic flux distribution caused on the outer peripheral surface becomes the rectangular wave shape including the many higher harmonic waves to increase iron loss.

The present invention, in order to be able to contribute to higher torque density, higher output density, and downsizing and prevent ineffective magnetic field and higher harmonic waves, provides a magnetic plate used for a rotor core of a motor, the magnetic plate having a body portion formed into an annular shape, the rotor core in which a plurality of the magnetic plates are stacked one on another and permanent magnets whose cross-section is approximately rectangular and is elongated in a circumferential direction of the body portion are held by a plurality of openings being formed so as to be elongated in the circumferential direction inside an outer peripheral edge and being arranged at a predetermined interval in the circumferential direction. The magnetic plate includes a magnetic pole portion being set between the outer peripheral edge of the body portion and the opening and having a radial width being set so as to be smaller than a rotor radial width (length of a short side. Hereinafter referred to as a radial sectional width of the permanent magnet) in a cross-section of the permanent magnet, and a higher hardness portion being set to be formed into a hook shape along an end corner of the opening and have a radial maximum width being a smaller width than the radial sectional width of the permanent magnet.

The magnetic plate of the present invention, because of the aforementioned configuration, allows a width of a portion spanning from the higher hardness portion being formed into the hook shape along the end corner of the opening to the magnetic pole portion to be set to be smaller than the radial sectional width of the permanent magnet, thereby to reduce magnetic resistance at the magnetic pole portion. The higher hardness portion being formed into the hook shape along the end corner of the opening improves centrifugal strength (resistance to plastic deformation) of the opening, prevents and activates ineffective magnetic flux that does not contribute to rotor rotation torque around the end corner of the opening, and prevent higher harmonic waves included in magnetic flux distribution generated on an outer peripheral surface of the rotor by the permanent magnet having the rectangular cross section.

Therefore, it contributes to higher torque, higher output and downsizing etc, required for industrial motors, electric vehicles and hybrid vehicles etc.

BRIEF DESCRIPTION OF THE DRAWINGS

FIG. 5 is a partial front view of a rotor according to the embodiment 1;

FIG. 6 is a partial front view of a rotor according to the embodiment 1;

EMBODIMENT FOR CARRYING OUT THE INVENTION

Figure 1:
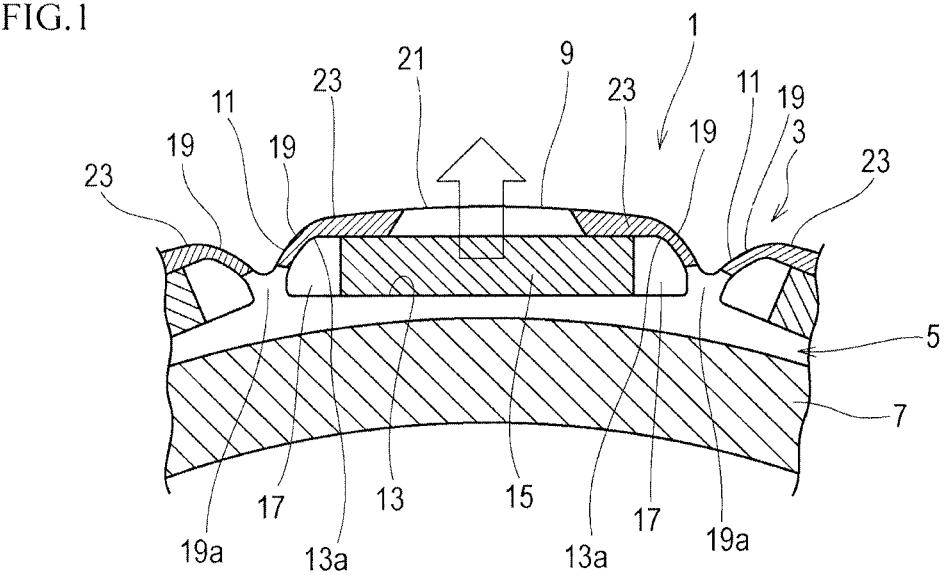
FIG. 1 is a partial front view of a rotor according to an embodiment 1.

The object that is to be able to contribute to higher torque, higher output, and downsizing and prevent ineffective magnetic field and higher harmonic waves is accomplished by a magnetic plate used for a rotor core of a motor, the magnetic plate having a body portion formed into an annular shape, the rotor core in which a plurality of the magnetic plates are stacked one on another and permanent magnets whose cross-section is approximately rectangular and is elongated in a circumferential direction of the body portion are held by a plurality of openings being formed so as to be elongated in the circumferential direction inside an outer peripheral edge and being arranged at a predetermined interval in the circumferential direction. The magnetic plate includes a magnetic pole portion being set between the outer peripheral edge of the body portion and the opening and having a rotor radial width being set so as to be smaller than a radial sectional width of the permanent magnet, and a higher hardness portion being set to be formed into a hook shape along an end corner of the opening and have a radial maximum width being a smaller width than the radial sectional width of the permanent magnet to have relatively-high yield stress.

The higher hardness portion may be set in a region spanning from a first edge positioned along the circumferential direction on an outer peripheral side of the body portion at a circumferential end of the opening and a second edge positioned on an edge being continuous to the first edge on a circumferential end edge side of the permanent magnet to a third edge on the outer peripheral edge side of the body portion corresponding to the first edge and a fourth edge of a bridge portion between the openings or an interposition between the openings.

The higher hardness portion may have an extent in the circumferential direction of the body portion, the extent being set up to a boundary that leads along an end edge of the permanent magnet to the outer peripheral edge side or set so as to exceed the boundary and enter a center of the magnetic pole portion.

The higher hardness portion may have an end edge in the circumferential direction of the body portion, the edge being slanted from the opening side toward the outer peripheral edge of the body portion so as to gradually enter a center side of the magnetic pole portion.

The outer peripheral edge of the body portion may be provided with a recessed portion in the form of being gradually cut in a portion between the magnetic pole portions. The slanted end edge of the higher hardness portion may reach the outer peripheral edge of the body portion at a starting point of the gradually-cut-in form of the recessed portion.

A length of the higher hardness portion in a direction along the end edge of the permanent magnet between the openings may be set more than ½ of the radial sectional width of the permanent magnet, and a length of the higher hardness portion overlapping the permanent magnet on an edge along the opening in the circumferential direction of the body portion may be set between ⅙ or less of a length (hereinafter referred to as circumferential sectional length of the permanent magnet) of a long side, which contacts with the magnetic pole portion, of the cross section of the permanent magnet in the rotor circumferential direction and 0. The higher hardness portion may be 1.3 to 2.3 times higher than a general part of the body portion in Vickers hardness.

The higher hardness portion may be subjected to compression working with a compression rate of 5 to 25% with respect to a thickness of the general part of the body portion.

The higher hardness portion may be 0.4 to 0.8 times fewer than the general part of the body portion in density of magnetic flux in a magnetic field of 4000 A/m.

The body portion of which a plurality of sheets are laminated may be made of a silicon steel sheet.

The silicon steel sheet of the body portion may have compositions (percentage by mass) of Si: 2 to 4 and the reminder: iron and unavoidable impurities.

The higher hardness portion may have hardness of 250 to 390 Hv.

The body portion may have a thickness of 0.1 to 0.5 mm.

The body portion may have a plurality of divided bodies being connected together and arranged annularly.

The higher hardness portion may be formed at each end of the opening in the circumferential direction of the body portion.

Embodiment 1

Shape Example 1

Figure 2:
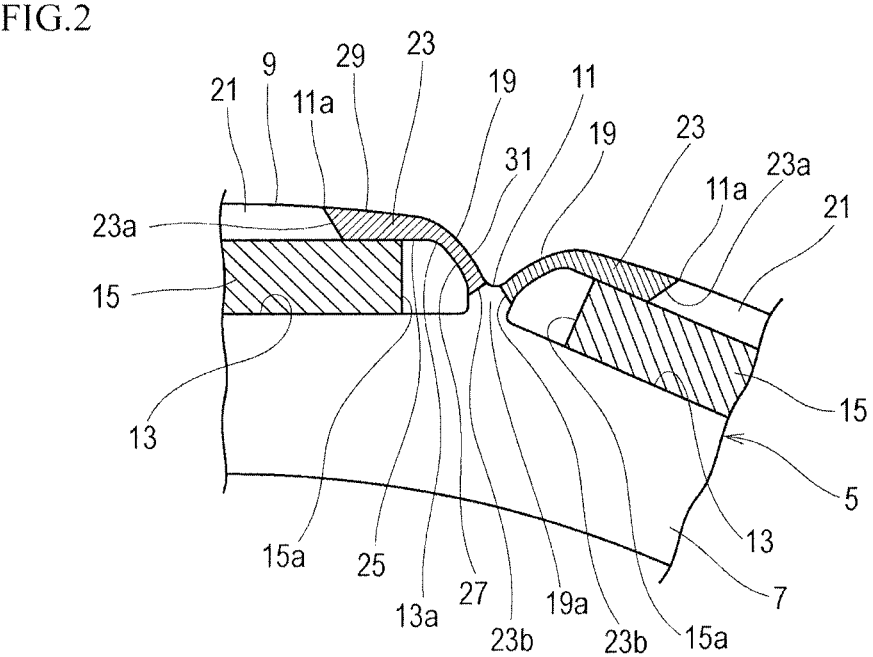
FIG. 2 is a partial front view of the rotor at a shifted rotational position according to the embodiment 1.
Figure 3:
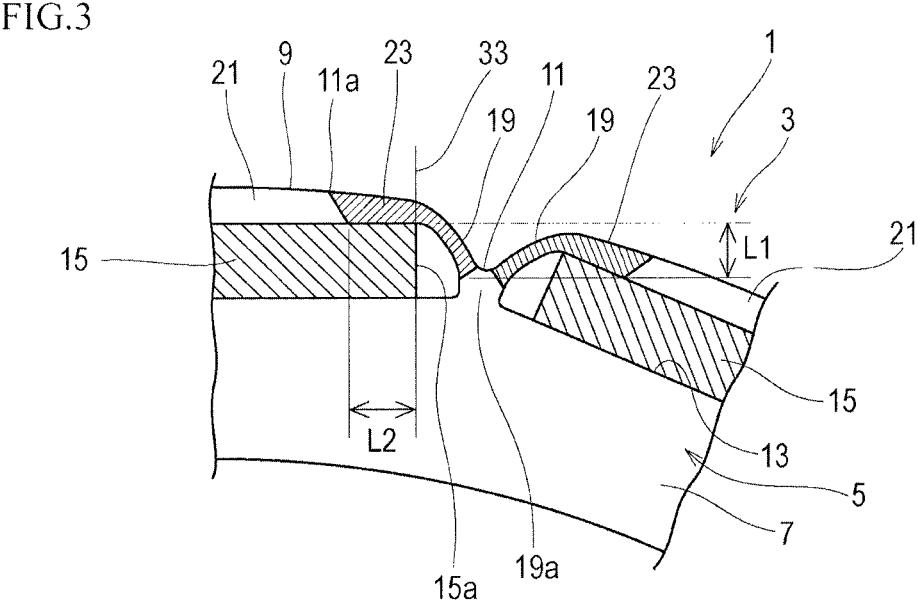
FIG. 3 is a partial front view illustrating a dimensional relationship according to the embodiment 1.

FIG. 1 is a partial front view of a rotor (a front face with respect to a magnetic plate face), FIG. 2 is a partial front view of the rotor at a shifted rotational position, and FIG. 3 is a partial front view illustrating a dimensional relationship. In addition, FIG. 1 is also used for explanation of a method of evaluating centrifugal strength mentioned later and therefore also illustrates hatching of a fixed portion and an arrow of a loading direction.

As illustrated in FIGS. 1 and 2, the rotor core 3 of the rotor 1 used for an electric motor is formed by stacking a plurality of the magnetic plates 5. Each magnetic plate 5 has the body portion 7 that is formed using material with high magnetic permeability such as silicon steel sheet in an annular shape such as disk or ring. The silicon steel sheet composing the body portion 7 has the compositions (percentage by mass) of Si: 2 to 4 and the reminder: iron and unavoidable impurities. Meanwhile, other materials may be used as the material of the magnetic plate 5.

To the body portion 7, recessed portions 11 are formed on the circular outer peripheral edge 9 at a predetermined interval in the circumferential direction. The recessed portions 11 is formed into a shape which is gradually cut in a portion between the magnetic pole portions. In each circumferential interval between the recessed portions a magnet slot 13 is formed inside the outer peripheral edge 9 as the opening in the circumferential direction to hold the magnet. A plurality of the magnet slots 13 are formed so as to be elongated in a tangential direction as the circumferential direction and are arranged at a predetermined interval in the circumferential direction, in each magnet slot 13, the permanent magnet 15 is held through an adhesive. In each magnet slot 13, a pair of permanent magnets may be held.

The permanent magnet 15 extends in a magnetic-plate-stacking direction and has the cross-section that is formed into an approximately rectangular shape and that is elongated in the circumferential direction of the body portion 7. A plurality of the permanent magnets are held by the magnet slots 13, thereby to be arranged at a predetermined interval in the circumferential direction of the body portion 7.

The magnet slot 13 is provided with an adhesive region 17 on each side of a region of the permanent magnet 15. The adhesive region 17 adjoins the bridge portion 19 and the bridge portion 19 is positioned between the magnet slot 13 and the recessed portion 11 of the outer peripheral edge 9 of the body portion 7. In each interposition between the magnet slots 13, a pair of the bridge portions 19 have inner end sides in a radial direction of the body portion 7, the inner end sides being integrated with each other as a joint portion 19a.

The radial width of the magnetic pole portion 21 between the outer peripheral edge 9 of the body portion 7 and the magnet slot 13 is set to be smaller than the radial sectional width of the permanent magnet 15. In this case, the comparison between the radial width of the magnetic pole portion 21 and the radial sectional width of the permanent magnet 15 is conducted using dimensions at the center of the magnetic pole as the position of the maximum width of the magnetic pole portion 21. To the body portion 7, the higher hardness portion 23 is provided to span from the bridge portion 19 to the magnetic pole portion 21. The higher hardness portion 23 is formed on each end of the magnet slot 13 in the circumferential direction of the body portion 7.

The higher hardness portion 23 is formed into the hook shape along the end corner 13a of the opening 13 and has the radial maximum width being formed to be a smaller width than the radial sectional width of the permanent magnet 15. According to the embodiment, the maximum width in the whole higher hardness portion 23 is formed to be smaller than the radial sectional width of the permanent magnet 15. However, only the radial maximum width of the higher hardness portion 23 may be formed to be a smaller width than the radial sectional width of the permanent magnet 15 and the width of the higher hardness portion 23 between the magnet slots 13 may be formed to be larger than the radial sectional width of the permanent magnet 15.

The higher hardness portion 23 is set by the compression working to have the higher hardness than the general portion of the body portion 7 other than the higher hardness portion 23. The higher hardness portion 23 is processed by the compression working with the compression rate of 5 to 23% relative to the thickness of the general portion of the body portion 7 that is, for example, 0.1 to 0.5 min. The higher hardness portion 23 is set to be 1.3 to 2.3 times higher than the hardness of the general part of the body portion 7 in Vickers hardness, in particular, the hardness of the higher hardness portion 23 is 250 to 390 Hv.

According to the setting, the higher hardness portion 23 is 0.4 to 0.8 times fewer than the general part of the body portion 7 in the density of the magnetic flux in the magnetic field of 4000 A/m.

As illustrated in FIG. 2, the higher hardness portion 23 is set in the region spanning from the first edge 25 and the second edge 27 to the third edge 29 and the fourth edge 31.

The first edge 25 is a part positioned along the circumferential direction on the outer peripheral side of the body portion 7 at the circumferential end of the magnet slot 13. The second edge 27 is a part of the bridge portion 19 positioned on the edge being continuous to the first edge 25 on the circumferential end edge 15a side of the permanent magnet 15. The third edge 29 is a part on the outer peripheral edge 9 side of the body portion 7 corresponding to the first edge 25. The fourth edge 31 is an outer part of the bridge portion 19 between the magnet slots 13.

According to the embodiment, therefore, the higher hardness portion spans the width of the entire portion extending from the magnetic pole portion. 21 to the bridge portion 19 in a formation range of the higher hardness portion 23.

However, the formation range of the higher hardness portion 23 may be formed partly in the width direction from the magnetic pole portion 21 to the bridge portion 19. The formation range may be formed partly in the width direction only on one of the magnetic pole portion 21 and the bridge portion 19 and be formed entirely in the width direction on the other thereof. Further, the formation range may be formed as a core portion with higher hardness only onto the midportion in the width direction in a case where the formation range is formed partly in the width direction on the magnetic pole portion 21 and/or the bridge portion 19.

The higher hardness portion 23 has the extent in the circumferential direction of the body portion 7, the extent being set so as to exceed the boundary 33 (FIG. 3) that leads along the end edge 15a of the permanent magnet 15 to the outer peripheral edge 9 side and enter the center side of the magnetic pole portion 21. In this case, the outer peripheral edge 9 side is the third edge 29 of the recessed portion 11 and is positioned inward relative to the outer peripheral edge 9 (for example, radially inward relative to the outer peripheral line of the rotor) in the radial direction of the body portion 7 as mentioned later.

The higher hardness portion 23 has the end edge 23a (FIG. 2) in the circumferential direction of the body portion 7, the end edge being slanted from the magnet slot 13 side toward the outer peripheral edge 9 of the body portion 7 so as to gradually enter the center side of the magnetic pole portion 21. The slanted end edge 23a of the hardness portion 23 reaches the outer peripheral edge 9 of the body portion 7 at the starting point 11a of the recessed portion 11. Namely, the starting point 11a is the point on the outer peripheral edge 9 from which the cut-in form starts so that the recessed portion 11 gradually deviates from the circular outer peripheral edge 9 (for example, the outer peripheral line of the rotor) toward the radial inside.

The higher hardness portion 23 has the end edge 23b in the radial direction of the body portion 7 that is positioned onto a boundary between the higher hardness portion and the joint portion 19a. The end edges 23b slanted and facing each other are set so that a distance between the edges gradually expands toward the inside in the radial direction of the body portion 7.

In FIG. 3, the higher hardness portion 23 has the length of L1 in the direction along the end edge 15a of the permanent magnet 15 between the magnet slots 13 and the length of L2 overlapping the permanent magnet 15 on the edge along the magnet slot 13 in the circumferential direction of the body portion 7. One end of L1 agrees with the edge of the permanent magnet 15 on the magnetic pole portion 21 side and the other end is the tip end of the end edge 23b in the direction along the end edge 15a.

L1 is set more than ½ of the radial sectional width of the permanent magnet 15 and L2 is set to ⅙ or less of the circumferential sectional length of the permanent magnet 15.

Shape Example 2

Figure 4:
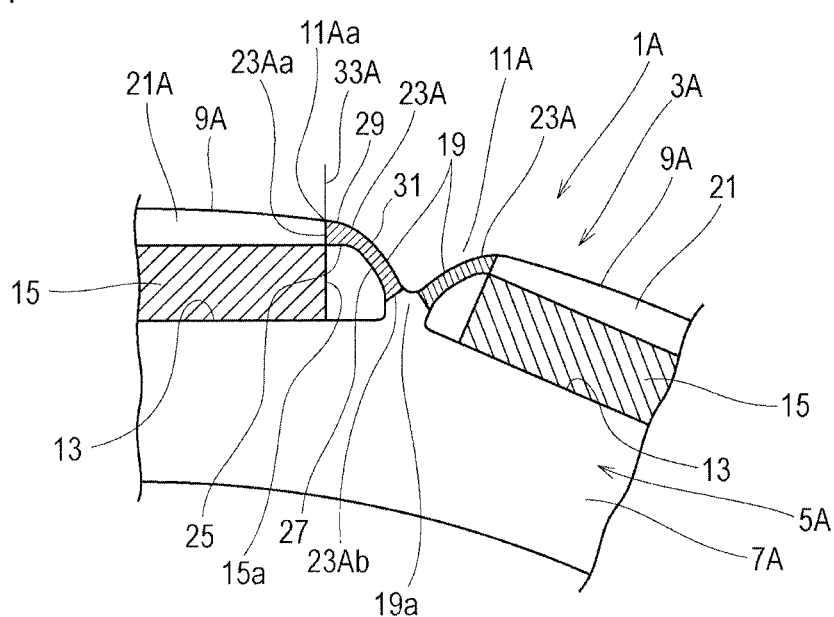
FIG. 4 is a partial front view of a rotor according to the embodiment 1.

FIG. 4 is a partial front view of a rotor corresponding to FIGS. 2 and 3. The same components as the shape example 1 are represented with the same reference numerals and corresponding components are represented with the same reference, numerals with "A", to avoid repetition in a description.

In the magnetic plate 5A according to the shape example 2 of the embodiment 1, the extent of the higher hardness portion 23A in the circumferential direction of the body portion 7 is set up to the boundary 33A that straightly leads along the end edge 15a of the permanent magnet 15 to the outer peripheral edge 9A. The end edge 23Aa of the higher hardness portion 23A in the circumferential direction of the body portion 7A is positioned onto the boundary 33A. In this shape example 2, the end edge 23Aa and the starting point 11Aa of the recessed portion 11A are positioned onto the boundary 33A. L2=0 is concluded.

The others are the same as the shape example 1.

Shape Example 3

FIG. 5 is a partial front view of a rotor corresponding to FIGS. 2 and 3. The same components as the shape example 1 are represented with the same reference numerals and corresponding components are represented with the same reference numerals with "B", to avoid repetition in a description.

In the magnetic plate 5B according to the shape example 3 of the embodiment 1, the extent of the higher hardness portion 23B in the circumferential direction of the body portion 7B is set so as to exceed the boundary 33B that leads along the end edge 15a of the permanent magnet 13 to the outer peripheral edge 9B and enter the center side of the magnetic pole portion 21. The end edge 23Ba of the higher hardness portion 23B in the circumferential direction of the body portion 7 is set in parallel with the boundary 33B.

The others are the same as the shape example 1.

Shape Example 4

FIG. 6 is a partial front view of a rotor corresponding to FIGS. 2 and 3. The same components as the shape example 1 are represented with the same reference numerals and corresponding components are represented with the same reference numerals with "C", to avoid repetition in a description.

In the magnetic plate 5C according to the shape example 4 of the embodiment 1, the setting of the end edge 23Cb of the higher hardness portion 23C is changed on the inner side in the radial direction of the body portion 7 with respect to the shape example 3. The end edge 23Cb is positioned away from the joint portion 19a in the radial direction of the body portion 7C, and the end edges 23Cb facing each other are approximately parallel with the end edge 15a of the permanent magnet 15.

The others are the same as the shape example 1.

Shape Example 5

Figure 7:
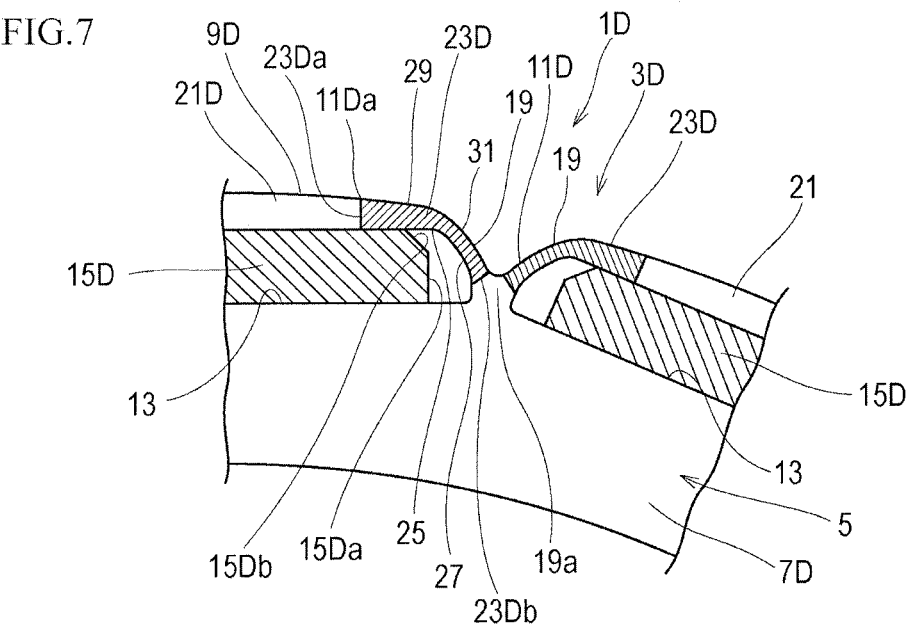
FIG. 7 is a partial front view of a rotor according to the embodiment 1.

FIG. 7 is a partial front view of a rotor corresponding to FIGS. 2 and 3. The same components as the shape example 1 are represented with the same reference numerals and corresponding components are represented with the same reference numerals with "D", to avoid repetition in a description.

In the magnetic plate 5D according to the shape example 5 of the embodiment 1, the higher hardness portion 23D is in common with the shape example 3 and the permanent magnet 15D has chamfered portions 15Db.

The others are the same as the shape example 1.

Shape Example 6

Figure 8:
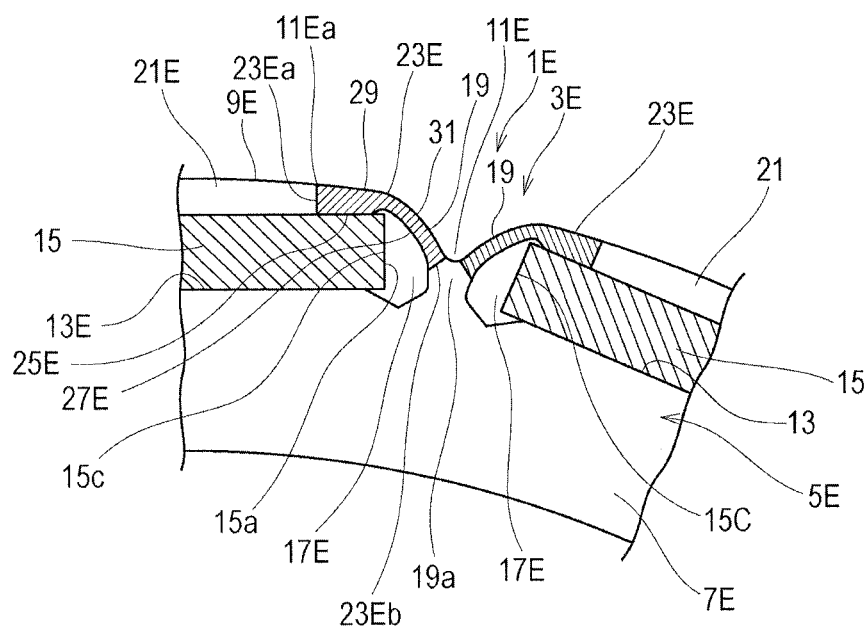
FIG. 8 is a partial front view of a rotor according to the embodiment 1.

FIG. 8 is a partial front view of a rotor corresponding to FIGS. 2 and 3. The same components as the shape example 1 are represented with the same reference numerals and corresponding components are represented with the same reference numerals with "E", to avoid repetition in a description.

In the magnetic plate 5E according to the shape example 6 of the embodiment 1, the adhesive region 17E is enlarged so as to enclose the end portion 15c of the permanent magnet 15 compared with the shape example 3.

The others are the same as the shape example 1.

Shape Example 7

Figure 9:
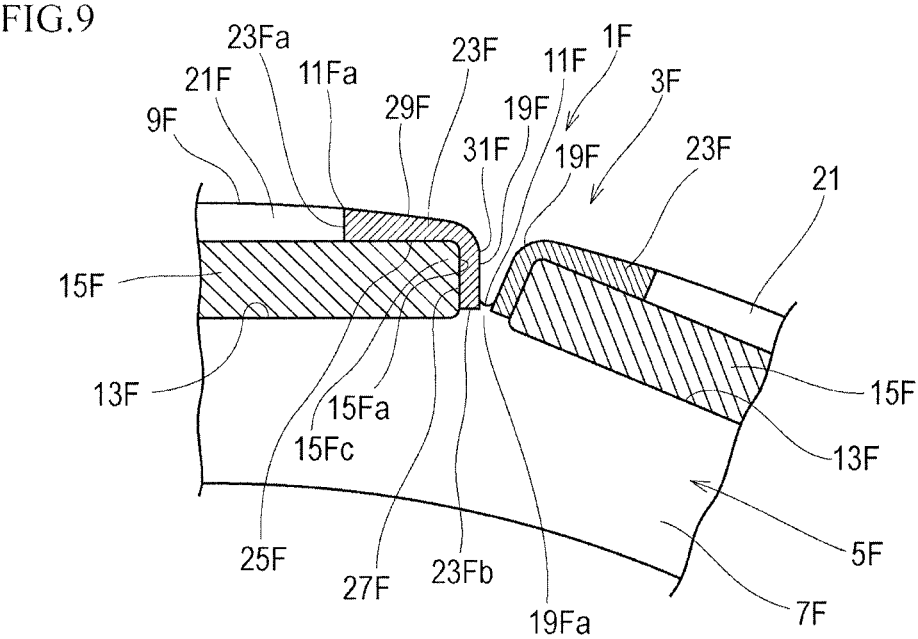
FIG. 9 is a partial front view of a rotor according to the embodiment 1.

FIG. 9 is a partial front view of a rotor corresponding to FIGS. 2 and 3. The same components as the shape example 1 are represented with the same reference numerals and corresponding components are represented with the same reference numerals with "F", to avoid repetition in a description.

In the magnetic plate 5F according to the shape example 7 of the embodiment 1, the higher hardness portion 23F is set in the region spanning from the first edge 25F and the second edge 27F to the third edge 29F and the fourth edge 31F.

The first edge 25F is the part positioned along the circumferential direction at the circumferential end of the magnet slot 13F. The second edge 27F is the part of the bridge portion 19 positioned on the same border as the first edge 25F. The third edge 29F is the part on the outer peripheral edge 9F side of the body portion 7F corresponding to the first edge 25F. The fourth edge 31F is the outer part of the bridge portion 19F between the magnet slots 13F.

The third edge 29F is not the edge of the recessed portion unlike the shape example 1, but is the part of the outer peripheral edge 9F (on the outer peripheral line of the rotor).

The magnetic plate 5F is not provided with adhesive regions in the magnet slot 13 and the sectional shape of the permanent magnet 15F is formed so as to match with the magnet slot 13F. Since the permanent magnet 15F is fitted to and held by the magnet slot 13F, the higher hardness portion 23F is set to have the hook shape in which the first edge 25 F and the second edge 27F are orthogonal with each other along the end 15Fc of the permanent magnet 15F.

The end edge 23Fa of the higher hardness portion 23F in the circumferential direction has the same setting as the shape example 3 and the end edge 23Fb in the radial direction is set so as to enter the joint portion 19Fa. The end edge 23Fb is in the circumferential direction of the body portion 7F like the tong side in the cross-section of the permanent magnet 15F.

The others are the same as the shape example 1.

Shape Example 8

Figure 10:
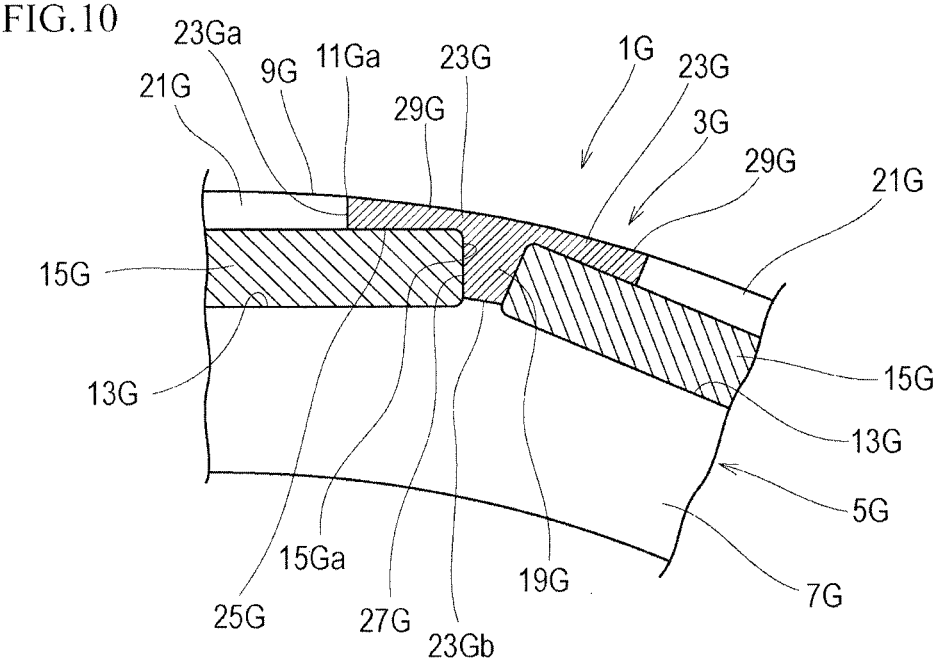
FIG. 10 is a partial front view of a rotor according to the embodiment 1.

FIG. 10 is a partial front view of a rotor corresponding to FIGS. 2 and 3. The same components as the shape example 1 are represented with the same reference numerals and corresponding components are represented with the same reference numerals with "G", to avoid repetition in a description.

In the magnetic plate 50 according to the shape example 8 of the embodiment 1, the body portion 7G has no recessed portion and the higher hardness portion 23G is set in the region spanning from the first edge 25G positioned along the circumferential direction at the circumferential end of the magnet slot 13G and the second edge 27G being the part of the bridge portion 19G on the same border as the first edge to the third edge 29G on the outer peripheral edge 9G side of the body portion 7G corresponding to the first edge 250 and the interposition between the magnet slots 13G. The higher hardness portion 230 has the T-shape. The third edges 290 are continuous to each other between the magnet slots 13G.

In addition, the bridge portion 19G is not the whole central portion of the T-shape. The bridge portions 19G of a pair of the higher hardness portions 23G are integrated with each other to form the central portion of the T-shape. Thus, the circumferential width of the bridge portion 19G is ½ of the circumferential width of the T-shape.

Comparative Example 1

Figure 11:
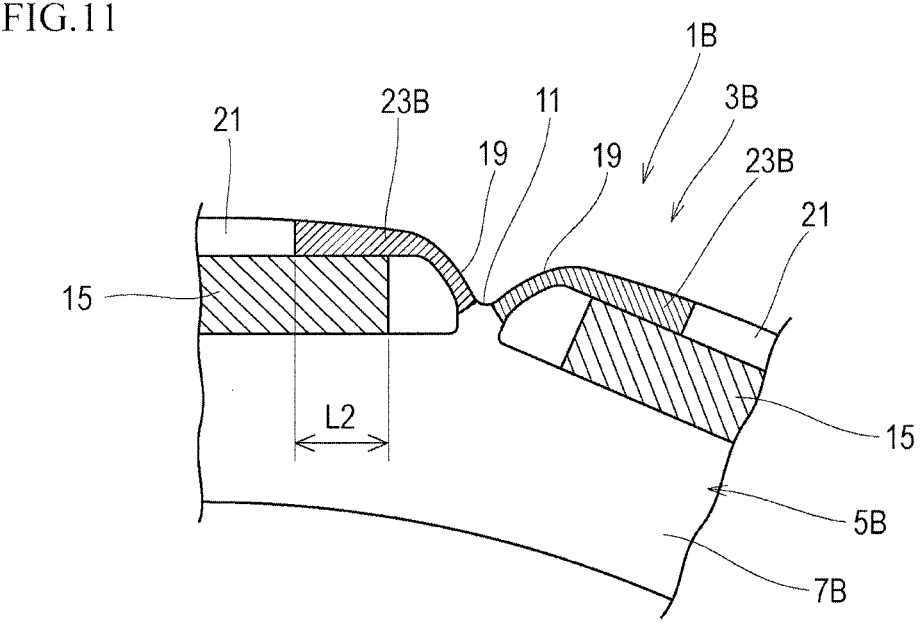
FIG. 11 is a partial front view of a rotor according to a comparative example.

FIG. 11 is a partial front view of a rotor corresponding to FIGS. 2 and 3 according to the comparative example 1. The comparative example has basically the same as the shape example 3 and only the representative numerals being the same as those of the shape example 3 are represented.

In the comparative example 1, the length L2 of the edge along the magnet slot 13 in the circumferential direction of the body portion 7B is set to be over ⅙ of the circumferential sectional length of the permanent magnet 15 in comparison with the shape example 3.

The others are the same as the shape example 3.

Comparative Example 2

Figure 12:
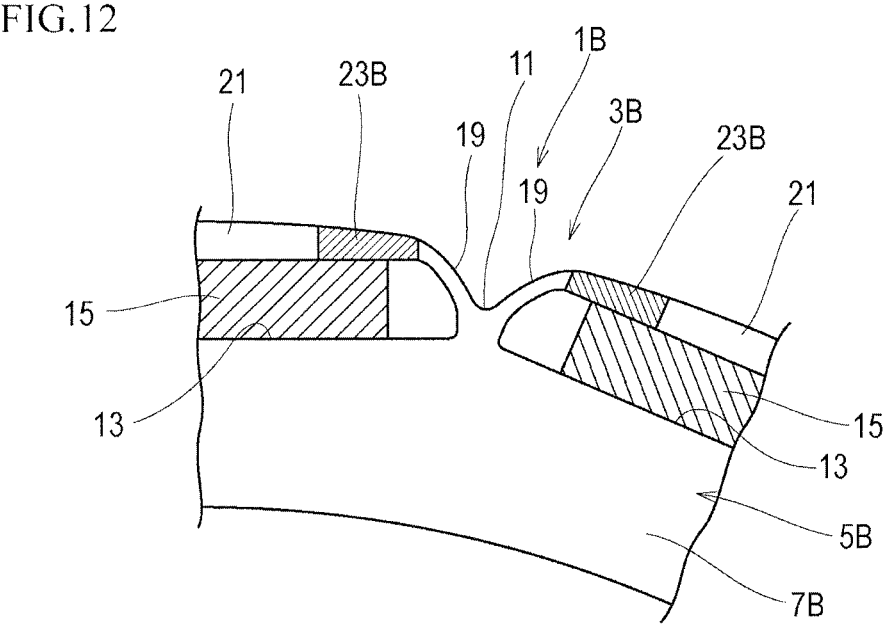
FIG. 12 is a partial front view of a rotor according to a comparative example.

FIG. 12 is a partial front view of a rotor corresponding to FIGS. 2 and 3 according to the comparative example 2. The comparative example has basically the same as the shape example 3 and only the representative numerals being the same as those of the shape example 3 are represented.

In the comparative example 2, the length L1 in the direction along the end edge 15a of the permanent magnet 15 between the magnet slots 13 is under ½ of the radial sectional width of the permanent magnet 15 in comparison with the shape example 3 and, for example, is set to L1=0.

The others are the same as the shape example 3.

[Grounds for the Length of the Higher Hardness Portion]

$$(0<=L2<=⅙)$$

Figure 13:
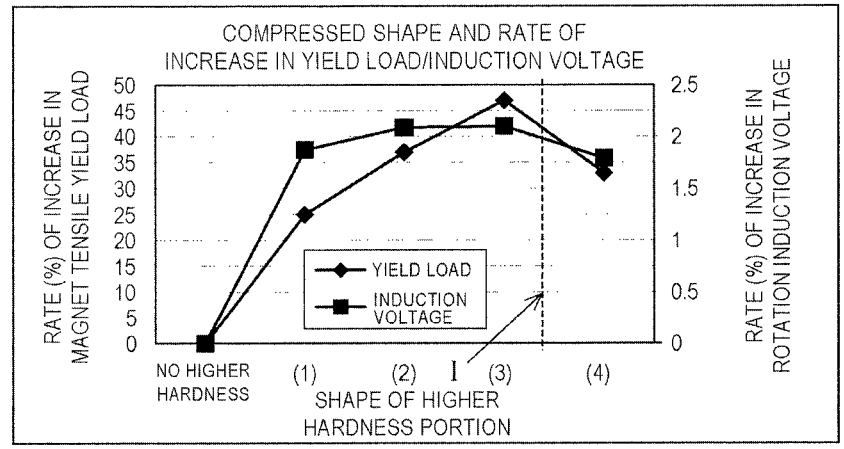
FIG. 13 is a graph in which shape examples of the embodiment and a shape example of the comparative example are compared with each other in rate of increase in yield load and rotation induction voltage.
Figure 14:
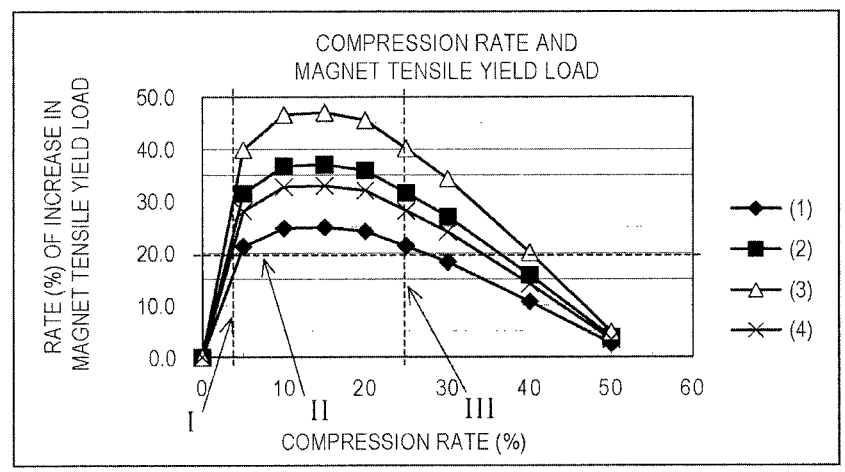
FIG. 14 is a graph in which the shape examples of the embodiment and the shape example of the comparative example are compared with each other in relationship between a compression rate and a rate of increase in magnet tensile yield load.
Figure 15:
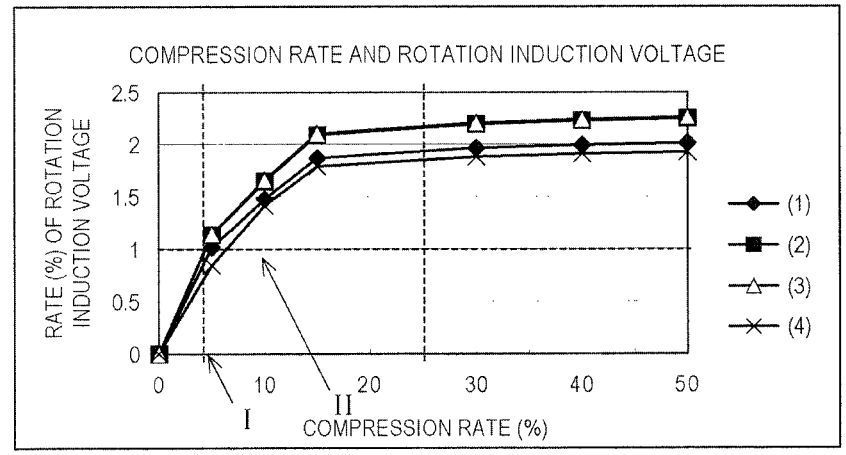
FIG. 15 is a graph in which the shape examples of the embodiment and the shape example of the comparative example are corn pared with each other in relationship between the compression rate and the rate of increase in rotation induction voltage.

FIG. 13 is a graph in which shape examples of the embodiment and shape example of the comparative example are compared with each other in rate of increase in magnet tensile yield load being a surrogate parameter for centrifugal strength and in rate of increase in voltage (hereinafter referred to as rotation induction voltage), which is a surrogate parameter for effective magnetic flux, induced by rotating the rotor with power of a different system from a stator in the stator to which no power is supplied. FIG. 14 is a graph in which the shape examples of the embodiment and the shape example of the comparative example are compared with each other in relationship between a compression rate at the time of processing to the higher hardness portion and the rate of increase in magnet tensile yield load. FIG. 15 is a graph in which the shape examples of the embodiment and the shape example of the comparative example are compared with each other in relationship between the compression rate and the rate of increase in rotation induction voltage.

Evaluation of the centrifugal strength is conducted as illustrated in FIG. 1. For effects in improving the centrifugal strength, the hatched region of the yoke portion 7a positioned inside with respect to the magnet slot 13 of FIG. 1 is fixed and a jig simulating the permanent magnet 15 is inserted into the opening.

A relation with displacement load when radially outward displacing the jig as the arrow is represented with a diagram, a proportional limit of the diagram is defined as the yield load, and the size thereof is substituted for the evaluation of the centrifugal strength.

The amount of the effective magnetic flux caused by generation torque of a motor is evaluated with the size of the rotation induction voltage as the surrogate parameter.

In FIG. 13, the abscissa represents the shape examples (1) to (4) and the ordinate represents the rate % of increase in magnet tensile yield load and the rate % of increase in rotation induction voltage. As the shape examples, (1): the shape example 2 of the embodiment 1, (2): the shape example 3 of the embodiment 1, (3): the shape example 1 of the embodiment 1, and (4): the shape example of the comparative example 1 are chosen. The compression rate of the higher hardness portion 23 is 14%.

To have higher hardness, a relevant portion is compressed and compression load is required for that. The areas of the higher hardness portions are set as (1)<(2)<(3)<(4) and the compression load becomes large as the area increases in the case of the same compression rate. In both the magnet tensile yield load and the rotation induction voltage, the rate of increase becomes maximum at (3). If the area is larger than that, the rate of increase declines to cause inefficient in processing energy (high cost).

Namely, a boundary is set as the arrow I to exclude the comparative example 1 of (4) and the setting is as 0<=L2<=⅙ in view of the processing energy.

In FIG. 14, the abscissa represents the compression rate and the ordinate represents the rate % of increase in magnet tensile yield load. Chosen examples are the same as FIG. 13.

As the arrow I in FIG. 14, the rate of increase more than 20% that is a market demand is satisfied from the compression rate of 5%. The bridge portion holding the permanent magnet 15 has a market demand for increasing the strength by at least approximate 20% as the arrow II in order to be as thin as possible and reduce leakage flux. In the compression rate more than 25% of the arrow III, the rate of increase in yield load is lower than that of the compression rate of 5% and causes inefficient in processing energy (production cost) of the compression working. For this, the upper limit of the compression rate is set to 25% as mentioned above.

In FIG. 15, the abscissa represents the compression rate and the ordinate represents the rate % of increase in rotation induction voltage. Chosen examples are the same as FIG. 13.

The comparative example 1 of (4) satisfies the demand for the magnet tensile yield load at the compression rate more than 5% of the arrow I. It, however, has the rate of increase in rotation induction voltage under required 1% (arrow II) that is out of the allowable range. It is not recognized as effective performance unless the rotation induction voltage as the surrogate parameter for the effective magnetic flux raises more than 1% by reducing the leakage flux.

The shape examples 2, 3 and 1 of (1) to (3) of the embodiment are within the allowable range.

Namely, the comparative example 1 of (4) is excluded and the setting is as 0<=L2<=⅙ in view of the performance.

(L1=>½)

Figure 16:
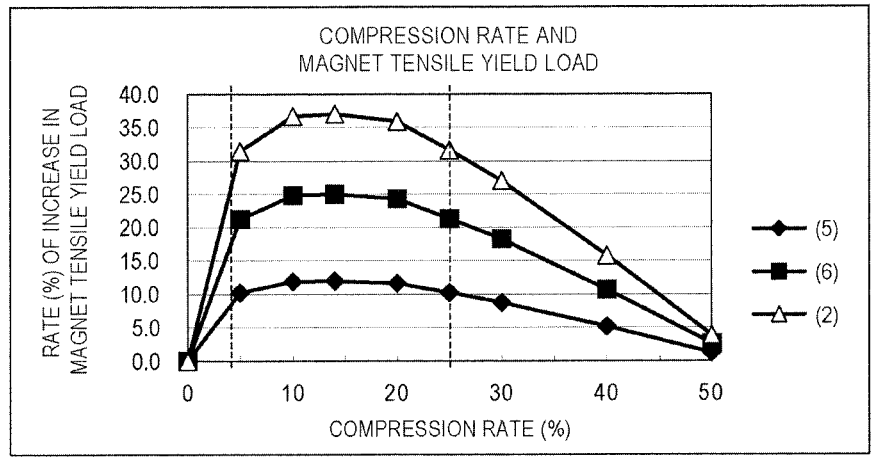
FIG. 16 is a graph in which shape examples of the embodiment and a shape example of the comparative example are compared with each other in relationship between a compression rate and a rate of increase in magnet tensile yield load.
Figure 17:
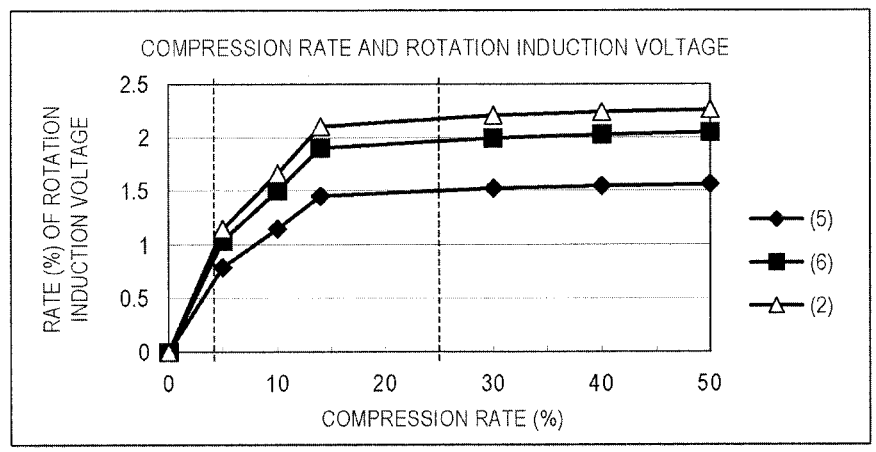
FIG. 17 is a graph in which the shape examples and the comparative example are compared with each other in relationship between the compression rate and a rate of increase in rotation induction voltage.

FIG. 16 is a graph in which the shape examples of the embodiment and a shape example of the comparative example are compared with each other in relationship between the compression rate and the rate of increase in magnet tensile yield load. FIG. 17 is a graph in which the shape examples and the comparative example are compared with each other in relationship between the compression rate and the rate of increase in rotation induction voltage.

In FIG. 16, the abscissa represents the compression rate and the ordinate represents the rate % of increase in magnet tensile yield load. As the shape examples, (5): the shape example of the comparative example 2, (6): the shape example 4 of the embodiment 1, and (2): the shape example 3 of the embodiment 1 are chosen.

In the compression rate 5 to 25%, the rate of increase in yield load of the higher hardness portion 231 of the comparative example 2 does not reach 20% whereas the shape examples 4 and 3 of the embodiment 1 have the rate of increase of 20% or more.

In FIG. 17, the abscissa represents the compression rate and the ordinate represents the rate % of increase in rotation induction voltage. Chosen examples are the same as FIG. 16.

The rate of increase in induction voltage of the higher hardness portion 23B of the comparative example 2 does not reach 1% in the compression rate 5% whereas the shape examples 4 and 3 of the embodiment 1 have the rate of increase of 1% or more in the compression rate 5 to 25%.

Namely, the comparative example 2 is excluded in the rate of increase in yield load and induction voltage, and the setting is as L1=>½ in view of the performance.

[Suppression of Higher Harmonic Waves]

The rotation induction voltage includes higher harmonic waves and a higher harmonic voltage factor (hereinafter referred to as HVF) is introduced and evaluated as a parameter indicating percentage content of the higher harmonic waves. HVF is expressed by an expression 1.

$$HVF = \sqrt{\sum_{k=2}^{13} \frac{Un^2}{n}} \quad (n \neq 3, 6, 9, 12) \qquad \text{(Expression 1)}$$

Figure 18:
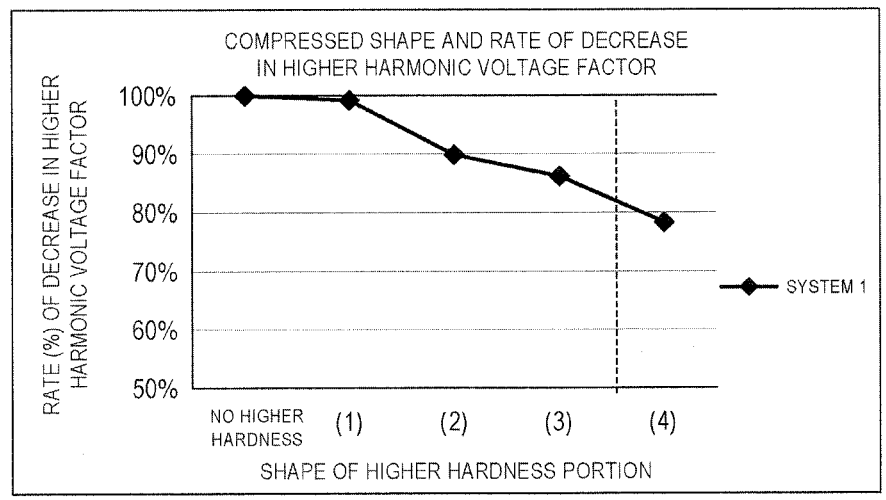
FIG. 18 is a graph illustrating a compressed shape and a rate of decrease in higher harmonic voltage factor.

Where,
Un: rate of the higher harmonic voltage of the n-th order relative to fundamental wave voltage
n: degree In FIG. 18, the abscissa represents the shape examples (1) to (4) and the ordinate represents the rate % of decrease in HVF. As the shape examples, (1): the shape example 2 of the embodiment 1, (2): the shape example 3 of the embodiment 1, (3): the shape example 1 of the embodiment 1, and (4): the shape example of the comparative example 1 are chosen and the compression rate of the higher hardness portion 23 is 14% similar to the above. To have higher hardness, a relevant portion is compressed and compression load is required for that. The areas of the higher hardness portions are set as (1)<(2)<(3)<(4) and the compression load becomes large as the area increases in the case of the same compression rate. The higher harmonic voltage factor reduces as the area increases.

Figure 19:
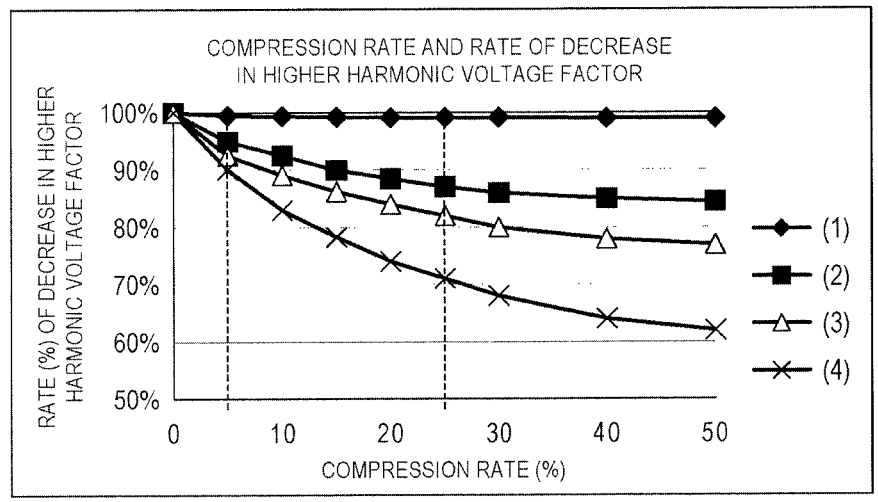
FIG. 19 is a graph illustrating the compression rate and the rate of decrease in higher harmonic voltage factor.
Figure 20:
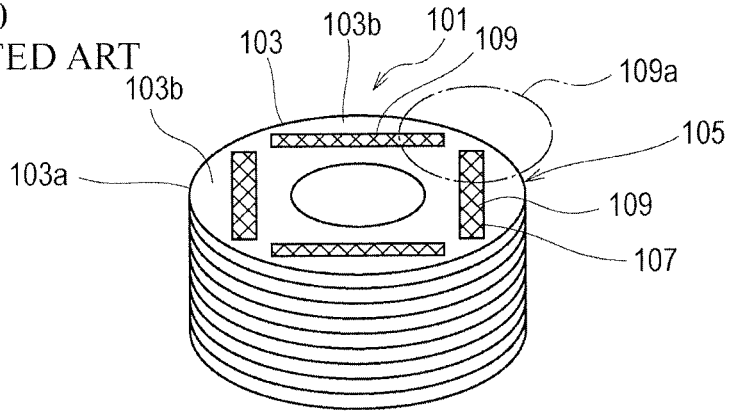
FIG. 20 is a perspective view of a rotor according to a related art.
Figure 21:
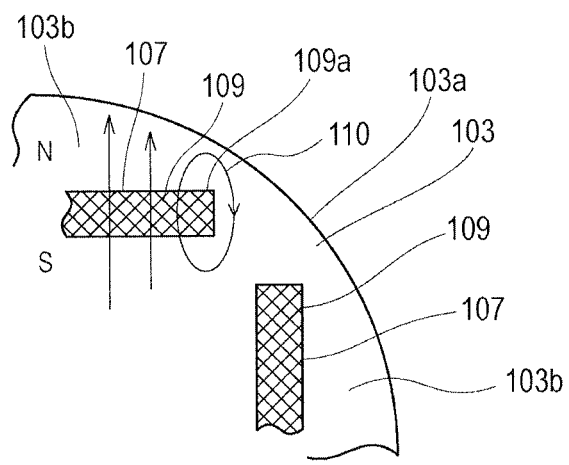
FIG. 21 is a conceptual diagram of formation of a magnetic field according to the related art.
Figure 22:
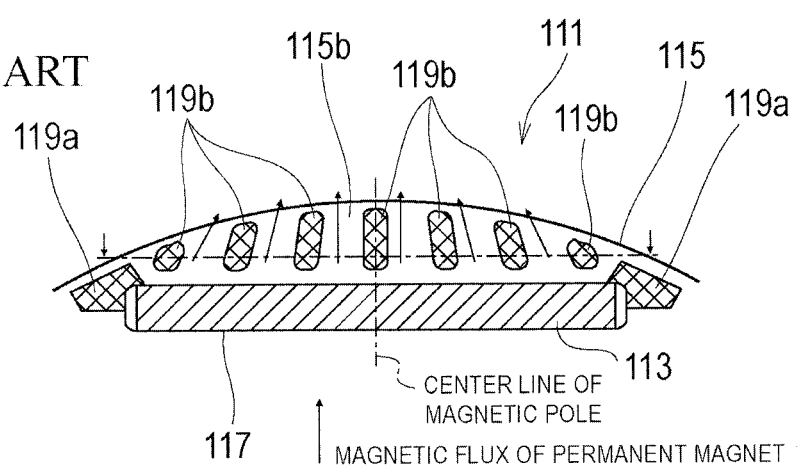
FIG. 22 is a partial front view of a rotor according to a related art.

In FIG. 19, the abscissa represents the compression rate and the ordinate represents the rate of decrease in HVF. Chosen shape examples are the same as the previous figure. In the same shape, if the higher hardness portion has the aforementioned compression rate range of 5 to 25%, the higher harmonic voltage factor is reduced relative to one without a higher hardness portion.

Further, since magnetomotive force of the permanent magnet 15 is generated in the radial direction, the HVF varies according to the range of the higher hardness portion on the magnetic pole portion 21 side. However, the effect on the HVF is negligible in the range of the higher hardness portion on the bridge portion 19 side. The range of the present invention is enough for the higher hardness portion on the bridge portion 19 side. Therefore, in the shape examples 1 to 8, the higher harmonic waves included in magnetic flux distribution generated by the permanent magnet 15 on the outer peripheral surface of the rotor are reduced to prevent iron loss.

[Suppression of Leakage Flux]

In the shape example 1, if the permanent magnet 15 in which the outer peripheral side of the long sides in the cross-section of the permanent magnet 15 is the North pole and the inner peripheral side thereof is the south pole is buried as illustrated in FIG. 1, the higher hardness portion 23 is formed from the bridge portion 19 toward the magnetic pole portion 21 to lower a magnetic property at this portion. Accordingly, the magnetic flux is mostly generated in a vertical direction relative to the long side in the cross-section of the permanent magnet 15 i.e. a circumferential direction of the rotor at the magnetic pole portion, to reduce the ineffective magnetic flux on the bridge portion 19 side and increase the effective magnetic flux for the rotation of the rotor.

The same holds for the shape examples 2 to 8.

[Manufacturing Method]

Regarding the shape example 1, as the formation of the higher hardness portion 23 to the body portion 7, the higher hardness portion is formed in advance by compressing a portion scheduled to be the higher hardness portion 23 before forming an outline of the body portion 7 from a plate material.

Meanwhile, the higher hardness portion 23 may be formed after forming the outline of the body portion 7.

The same holds for the shape examples 2 to 8.

[Divided Core]

The body portion 7 may be applied to one having a plurality of divided bodies being connected together and arranged annularly.

According to the embodiment 1 of the present invention, the magnetic plate 5 used for the rotor core of the motor, the magnetic plate having the body portion 7 formed into the annular shape, the rotor core in which a plurality of the magnetic plates are stacked one on another and permanent magnets whose cross-section is approximately rectangular and is elongated in the circumferential direction of the body portion 7 are held by a plurality of the magnet slots 13 being formed so as to be elongated in the circumferential direction inside the outer peripheral edge 9 and being arranged at the predetermined interval in the circumferential direction. The magnet plate includes the magnetic pole portion 21 being set between the outer peripheral edge 9 of the body portion 7 and the magnet slot 13 and having the radial width being set so as to be smaller than the radial sectional width of the permanent magnet 15, and the higher hardness portion 23, relative to the general portion, being formed into the hook shape along the end corner of the magnet slot 13 and having the smaller width than the radial sectional width of the permanent magnet 15.

Accordingly, the width of the magnetic pole portion 21 is set to be smaller than the radial sectional width of the permanent magnet 15, to reduce magnetic resistance of the magnetic pole portion 21 and increase the effective magnetic flux for the rotation of the rotor.

The same holds for the other magnetic plates 5A to 5G.

It prevents and activates ineffective magnetic flux that does not contribute to the rotor rotation torque at the bridge portion 19 around the end corner of the magnet slot 13. Further, the width of the higher hardness portion 23 is smaller than the radial sectional width of the permanent magnet 15 to further accurately prevent and activate ineffective magnetic flux.

The same holds for the other magnetic plates 5A to 5G.

In addition, the magnet slot is not limited to the strict rectangular shape, and, for example, it may be a slight arc shape on a concentric circle with the rotor. The arrangement and the number of the magnetic slots are appropriately chosen according to a use of the electric motor.

The invention claimed is:

1. A magnetic plate for use in a rotor core of a motor, wherein the magnetic plate has a body portion formed into an annular shape, the rotor core in which a plurality of the magnetic plates are stacked one on another and permanent magnets whose cross-section is approximately rectangular and are elongated in a circumferential direction of the body portion are held by a plurality of openings which are elongated in a circumferential direction inside an outer peripheral edge of the body portions and are arranged on the body portions at a predetermined interval in the circumferential direction, the magnetic plate comprising:
   a magnetic pole portion situated between the outer peripheral edge of the body portion and the opening and having a radial width smaller than a radial sectional width of the permanent magnet; and
   a higher hardness portion being formed on the body portion into a hook shape along an end corner of the opening and having a radial maximum width smaller than the radial sectional width of the permanent magnet, the higher hardness portion being set higher in hardness than the body portion other than the higher hardness portion.

2. The magnetic plate according to claim 1, wherein the higher hardness portion is set in a region spanning from a first edge positioned along the circumferential direction on an outer peripheral side of the body portion at a circumferential end of the opening and a second edge positioned on an edge which is continuous to the first edge and on a circumferential end edge side of the permanent magnet to a third edge on the outer peripheral edge side of the body portion corresponding to the first edge and a fourth edge of a bridge portion between the openings or an interposition between the openings.

3. The magnetic plate according to claim 1, wherein the higher hardness portion extends in the circumferential direction of the body portion to a boundary that runs along an end edge of the permanent magnet to the outer peripheral edge or exceeds the boundary and extends into a center side of the magnetic pole portion.

4. The magnetic plate according to claim 1, wherein the higher hardness portion has an end edge in the circumferential direction of the body portion, the edge being slanted from the opening side toward the outer peripheral edge of the body portion so as to gradually enter a center side of the magnetic pole portion.

5. The magnetic plate according to claim 1,
wherein the outer peripheral edge of the body portion is provided with a recessed portion in the form of being gradually cut in a portion between the magnetic pole portions.

6. The magnetic plate according to of claim 5,
wherein the slanted end edge of the higher hardness portion reaches the outer peripheral edge of the body portion at the starting point of the gradually-cut-in form of the recessed portion.

7. The magnetic plate according to claim 1,
wherein a length of the higher hardness portion in a direction along an end edge of the permanent magnet between the openings is set more than ½ of the radial sectional width of the permanent magnet, and
wherein a length of a part of the higher hardness portion overlapping the permanent magnet on an edge along the opening in the circumferential direction of the body portion is set between ⅙ or less of a circumferential sectional length of the permanent magnet and 0.

8. The magnetic plate according to claim 1,
wherein the higher hardness portion is 0.4 to 0.8 times less than a general part of the body portion in density of magnetic flux in a magnetic field of 4000 A/m.

9. The magnetic plate according to claim 1,
wherein a thickness of the body portion is 0.1 to 0.5 mm.

10. The magnetic plate according to claim 1,
wherein the body portion has a plurality of divided bodies being connected together and arranged annularly.

11. A method of manufacturing the magnetic plate according to claim 1,
wherein the higher hardness portion is formed by compressing a portion which is to be the higher hardness portion before forming an outline of the body portion from a plate material.

12. The magnetic plate according to claim 1,
wherein the higher hardness portion has a thickness reduced in a range of compression ratio of 5-25% relative to a thickness of a remainder of the body portion.

* * * * *